(12) United States Patent
Pepe et al.

(10) Patent No.: US 12,429,409 B2
(45) Date of Patent: Sep. 30, 2025

(54) APPARATUS AND SYSTEM FOR ULTRASOUND-ASSISTED SALT PRECIPITATION AND SCALING TESTS AND USE

(71) Applicants: PETRÓLEO BRASILEIRO S.A.—PETROBRAS, Rio de Janeiro (BR); UNIVERSIDADE FEDERAL DA BAHIA, Salvador (BR)

(72) Inventors: Iuri Muniz Pepe, Salvador (BR); Geydison Gonzaga Demetino, Salvador (BR); Andre Leibsohn Martins, Rio de Janeiro (BR); Luiz Carlos Simões Soares Júnior, Salvador (BR); Marcus Vinicius Duarte Ferreira, Rio de Janeiro (BR); Helga Elisabeth Pinheiro Schluter, Niterói (BR); Lucas Ramalho Oliveira, Salvador (BR); Bruno Barbosa Castro, Rio de Janeiro (BR)

(73) Assignees: PETRÓLEO BRASILEIRO S.A.—PETROBRAS, Rio de Janeiro (BR); UNIVERSIDADE FEDERAL DA BAHIA, Salvador (BR)

( * ) Notice: Subject to any disclaimer, the term of this patent is extended or adjusted under 35 U.S.C. 154(b) by 670 days.

(21) Appl. No.: 17/725,192

(22) Filed: Apr. 20, 2022

(65) Prior Publication Data
US 2022/0341834 A1 Oct. 27, 2022

(30) Foreign Application Priority Data
Apr. 22, 2021 (BR) ........................ 10 2021 007737 9

(51) Int. Cl.
*G01N 15/04* (2006.01)
*G01N 15/00* (2006.01)

(52) U.S. Cl.
CPC ..... *G01N 15/04* (2013.01); *G01N 2015/0053* (2013.01); *G01N 2015/0092* (2013.01)

(58) Field of Classification Search
CPC ........... G01N 15/04; G01N 2015/0053; G01N 2015/0092; G01N 2015/0687
USPC .............. 73/53.01, 61.62–61.71, 64.56, 866; 422/68.1, 82.01, 82.02, 82.03, 82.04, 422/82.05; 134/22.1–24
See application file for complete search history.

(56) References Cited

U.S. PATENT DOCUMENTS

| 6,375,829 B1* | 4/2002 | Shevchenko ........ G01N 29/022 73/61.62 |
| 2023/0135692 A1* | 5/2023 | Wang ..................... C09K 8/524 73/61.62 |

\* cited by examiner

Primary Examiner — Robert R Raevis
(74) Attorney, Agent, or Firm — Sughrue Mion, PLLC

(57) ABSTRACT

The present invention relates to an apparatus for salt precipitation and scaling tests, which comprises two reagent storage tanks (2, 3), a reagent mixing module (6), induction period measurement modules (7, 12), an ultrasound-assisted precipitation module (9) and a scaling module with heat exchanger (13). From the apparatus, it is possible to carry out tests with the purpose of investigating the influence of parameters such as flow rate, temperature and concentration on salt precipitation and scaling. It is further possible to carry out tests under the action of ultrasound, since it promotes acceleration of chemical reactions.

16 Claims, 3 Drawing Sheets

APPARATUS AND SYSTEM FOR ULTRASOUND-ASSISTED SALT PRECIPITATION AND SCALING TESTS AND USE

FIELD OF INVENTION

The present invention addresses to an apparatus for ultrasound-assisted salt precipitation and scaling tests to be applied in laboratory investigations, aiming at studying the various factors that influence the precipitation and scaling of salts, efficiency of inhibitors, including under the effect of ultrasound.

DESCRIPTION OF THE STATE OF THE ART

The scales consist of salts that, when precipitating, agglomerate and adhere to the various oil production systems, creating great losses to companies due, for example, to the decrease and even total stop of production. The most common scales are barium sulfate, strontium sulfate, magnesium carbonate and calcium carbonate.

One of the mechanisms of scale formation is the variation in environmental conditions such as pressure, temperature, water composition, concentration and pH, which causes the saturation limit of a certain mineral in the solution to be reached. One of the mechanisms, in the production/extraction of oil, occurs from the chemical reaction that is carried out due to the mixture of formation water and injection water, which causes the precipitation of salts. The formation water, in general, has a concentration of $Ca^{2+}$ and $Mg^{2+}$ ions, while the injection water (sea water) has $SO_4^{2-}$ ions. Formation water together with crude oil are a rich source of ions ($Cl^-$), sodium ($Na^+$), sulfate ($SO_4^{2-}$), bicarbonate ($HCO_3^-$), calcium ($Ca^{2+}$) and magnesium ($Mg^{2+}$). According to Vasyliev (VASYLIEV, G.; VASYLIEVA, S.; NOVOSAD, A.; GERASYMENKO, Y., Ultrasonic modification of carbonate scale electrochemically deposited in tap water. Ultrasonics Sonochemistry, v. 48, May, p. 57-63, 2018), the costs of lost production due to scaling are 9 billion dollars in the United States of America, 3 billion dollars in Japan, 0.8 billion dollars in the United Kingdom and 1.5 billion euros in France.

One of the methods of preventing scaling is by means of the use of scaling inhibitors, which are chemical components capable of removing cations from scaling or acting as an intermediate in the phases of scaling formation by inhibiting nucleation and crystal distortion.

For the detection of scale formation, pressure variation, pH measurement and ion concentration methods are commonly used. Another method is based on the induction time, obtained by means of measurements of the conductivity of the solution; this procedure is widely used to monitor both nucleation and growth of inorganic crystalline minerals.

In some applications such as sonochemistry, sonoluminescence and surface cleaning, ultrasound is used in order to promote the phenomenon of cavitation in fluids. Cavitation occurs due to compression (positive pressure) and rarefaction (negative pressure) zones in the fluid, caused by vibration transmitted by an ultrasonic transducer. During the rarefaction period, the fluid reaches the vapor pressure limit which causes cavities (bubbles) to appear in the fluid; these bubbles cyclically increase and decrease in size until they reach a critical size and implode, thus producing shock waves, transfer of energy, micro jets of fluid and great local temperature increase known as hot spots; these effects are used as agents in various applications of the ultrasonic transducer. For example, acceleration of chemical reactions, cleaning of surfaces by erosion, machining, light emission and processing (crystallization, emulsification, dispersion, homogenization and extraction).

To an understanding on the formation of carbonates and sulfates, it is necessary to carry out experiments on a laboratory scale; several authors in the scientific literature and in patents report apparatus/benches for the production of carbonates and sulfates, in addition to the evaluation of inhibitors. Some of these benches also allow the use of ultrasound.

The study of MURYANTO, S.; BAYUSENO, A. P.; SEDIONO, W.; MANGESTIYONO, W.; SUTRISMO (2012), "Development of a versatile laboratory project for scale formation and control", Education for chemical engineers, p. e78-e84, reports an experimental bench for the formation of calcium sulfate consisting of four tanks, two of them for storing reagents and two for equalization and maintenance of constant flow rate. Its operation starts with the pumping of the reagents from the storage tanks to the equalization tanks, next the reagents are mixed and circulated through the test section, which is where the scaling occurs. In this bench, the temperatures of the tanks and the flow rate of reagents in the test section are controlled.

In another scientific article, WANG, H.; HUANG, W.; HAN, Y. (2013), "Diffusion-reaction compromises the polymorphs of precipitated calcium carbonate", v. 1, p. 301-308, proposes a bench for the formation of calcium carbonate by diffusion, which consists of a tank divided into 3 parts, the one on the right and the left comprising reagents and the central part is filled with distilled water. The 3 parts are separated by mobile gates and, once removed, the reagents are mixed in the central part and the chemical reaction occurs, thus forming calcium carbonate; in this apparatus, the flow rates or temperatures are not controlled.

Patent CN208488458U reports an invention of an experimental apparatus for inducing calcium carbonate formation by using microorganisms. The patent CN104316647 reports an apparatus and a method for the study of scaling and inhibitors, which consists of tanks, a pump for fluid circulation and a system for monitoring the scaling by means of a camera. The apparatus has temperature and pressure control.

Patent CN108375525A reports an experimental apparatus consisting of a container from which a constant pressure pump causes the liquid to circulate through a capillary tube. In this tube, there will be scaling causing the diameter of the capillary to be reduced and the flow to decrease; the degree of scaling is determined by the volume of fluid received after the capillary tube. The scale inhibiting capacity of the scale inhibitor can be determined by different test conditions (temperature, chemical dose, ion concentration of the scale, etc.).

The works of NISHIDA, I. (2004), "Precipitation of calcium carbonate by ultrasonic irradiation", Ultrasonics sonochemistry, v. 11, p. 423-428; PRICE, G. J.; MAHON, M. F.; SHANNON, J.; COOPER, C. (2011), "Composition of calcium carbonate polymorphs precipitated using ultrasound", Crystal, Growth & Design, v. 11, p. 39-44; KOJIMA, Y.; YAMAGUCHI, K.; NISHIMIYA, N. (2010), "Effect of amplitude and frequency of ultrasonic irradiation on morphological characteristics control of calcium carbonate", Ultrasonics sonochemistry, v. 17, p. 617-620, report investigations of the effects of ultrasound on the precipitation of calcium carbonate and on the morphology of the formed crystals.

The reference of LORANGER, E.; PANQUIN, M.; DANEAULT, C.; CHABOT, B. (2011), "Comparative study of sonochemical effects in an ultrasonic bath and in a large scale flow-through sonoreactor", Chemical Engineering Journal, v. 178, p. 359-365, reports a comparative study between an ultrasonic reactor in flow and an ultrasonic bath (static fluid), in which the reactor presented superior performance in relation to the sonochemical effects.

In the paper of TAHERI-SHAKIB, J.; NADERI, H.; SALIMIDELSHAD, Y.; KAZEMZADEH, E. SHEKARI-FARD, A. (2018), "Application of ultrasonic as a novel technology for removal of inorganic scales (KCl) in hydrocarbon reservoirs: An experimental approach", Ultrasonics—Sonochemistry, v. 40, p. 249-259, discloses an investigative study of the effectiveness of ultrasonic waves in the removal of sodium chloride (KCl) scale, disclosing a laboratory-scale apparatus for monitoring and measuring the results. Such a document discloses monitoring tests with and without ultrasound, showing results, when using water injection, with and without ultrasonic waves, and the permeability of the samples at each stage of the experiment, in which the ultrasonic waves can restore the permeability of the core samples with different permeabilities, as well as also removing/inhibiting the formation of KCl scales. However, such an apparatus does not focus on the monitoring of inorganic scale, which allows studying the various factors that influence the precipitation and scaling of salts and the efficiency of scale inhibitors; in addition, it does not disclose similarities regarding the apparatus disclosed in the present invention.

The document of MANGESTIYONO, W.; MURYANTO, S.; JAMARI, J.; BAYUSENO, A. P. (2016), "The influence of vibration on $CaCO_3$ scale formation in piping system", MATEC Web of Conferences, 58, 01027, 6 p, discloses an experimental apparatus to analyze the effect of vibration on kinetics, deposition rates and formation of calcium carbonate crystals in tubes in the synthetic solution. Thus, the apparatus analyzes the induction period of scale formation, deposit rates, scale mass, crystal morphology and chemical composition. However, such an apparatus does not disclose the use of an ultrasound-assisted precipitation module, a scaling module with heat exchanger, temperature sensors and pressure sensor.

The document of RAHARJO, S; BAYUSENO, A.; JAMARI; MURYANTO, S. (2016), "Calcium Carbonate Scale Formation in Copper Pipes on Laminar Flow", MATEC Web of Conferences, 58, 01029, 4 p., discloses a monitoring apparatus to prevent the occurrence of scales and the characterization thereof, in which the apparatus analyzes the nucleation, the growth of $CaCO_3$ crystals, the potential of scaling in tubes, the induction time, the characterization and morphology of the crystals and the influence of flow rates on the mass of precipitates. However, such an apparatus does not disclose the use of an ultrasound-assisted precipitation module, a scaling module with heat exchanger, temperature sensors and a pressure sensor.

The reference of LIMA, J. F.; VILAR, E. O. (2014), "The use of ultrasound to reduce cathodic scaling", Ultrasonics Sonochemistry, v. 21, p. 963-969 discloses an apparatus in order to minimize scaling of electrochemical cells used for the electroflotation of saline water produced by the oil industry by means of ultrasonic transducers. However, the configuration of said apparatus does not disclose components such as reagent storage tanks, a distilled or deionized water storage tank, a cleaning solution storage tank, fluid circulation pumps, a reagent mixing module, induction period measurement modules, according to the present invention.

The inventions and scientific articles reported present experimental benches for the study of inorganic precipitation and scaling, as well as inhibitor performance tests. And apparatus for investigating the effects of ultrasound in static solutions or with mechanical agitation in a vessel are reported.

Accordingly, no document of the state of the art discloses an apparatus applied to studies of acceleration of chemical reactions, with reagents in flow, assisted by ultrasound and that allows control of pressure, flow rate and temperature and monitoring of chemical reactions from induction period, such as that of the present invention.

Scales result into great damages as they reduce production, impact the operation of instruments and generate load on pumps. Thus, the present invention is of great importance, since the investigations support the development of solutions to the problem, which in turn brings great savings.

BRIEF DESCRIPTION OF THE INVENTION

The present invention refers to an apparatus that allows studying the various factors that influence the precipitation and scaling of salts, in addition to the efficiency of inhibitors. Tests can be performed with or without ultrasound effect. The apparatus consists of storage tanks for reagents and a cleaning solution, pumps for fluid circulation and reagent mixing, ultrasound-assisted precipitation, induction period measurement and scaling modules.

BRIEF DESCRIPTION OF DRAWINGS

The present invention will be described in more detail below, with reference to the attached figures which, in a schematic way and not limiting the inventive scope, represent examples of embodiment thereof. In the drawings, there are.

DETAILED DESCRIPTION OF THE INVENTION

Figure 1:
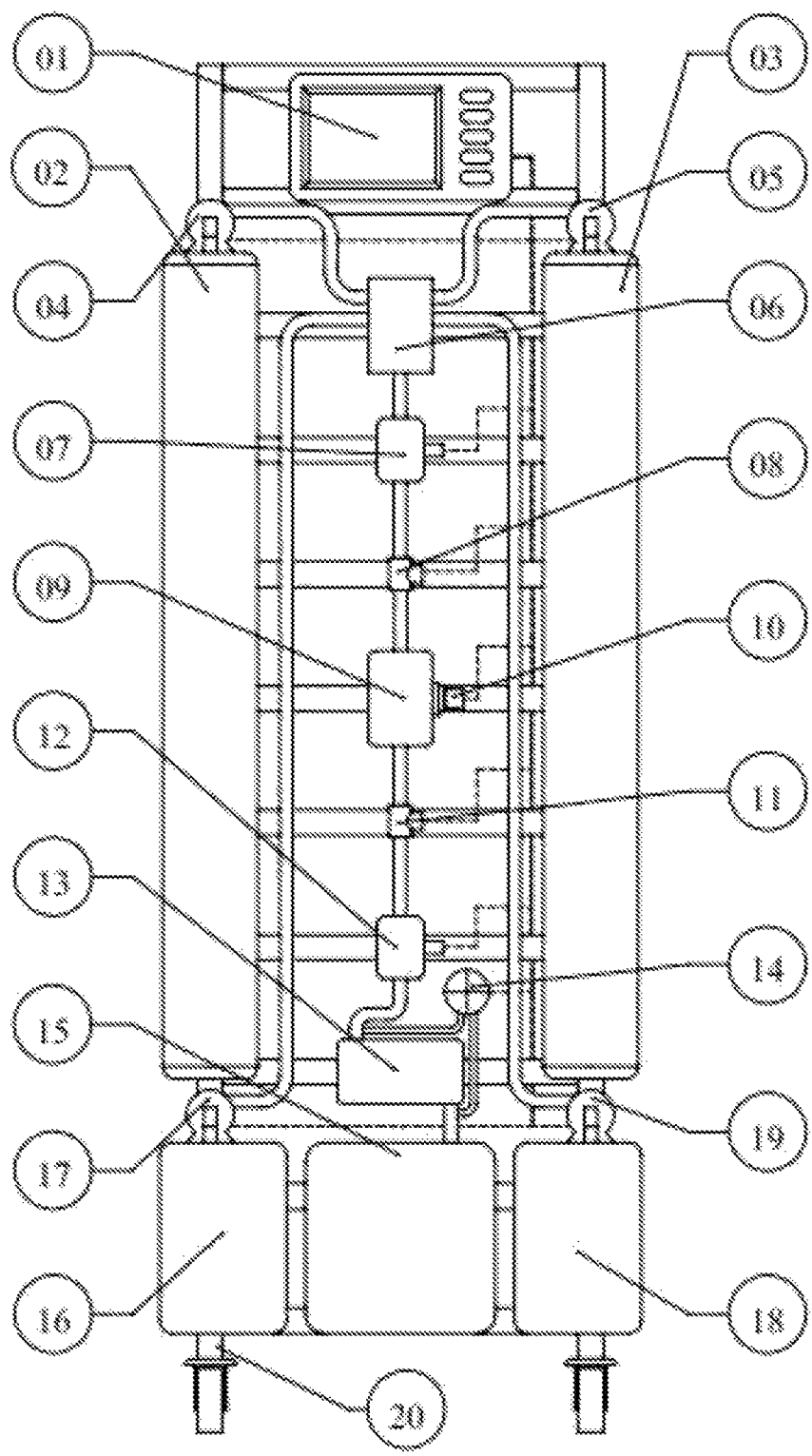
FIG. 1 illustrating a front view of the apparatus with its main components: (1) electronic system, (2) first reagent storage tank, (3) second reagent storage tank, (4) and (5) pumps, (6) reagent mixing module, (7) first induction period measurement module, (8) first temperature sensor, (9) ultrasound-assisted precipitation module, (10) ultrasonic transducer or piezoelectric wafer, (11) second temperature sensor, (12) second induction period measurement module, (13) scaling module with heat exchanger, (14) pressure sensor, (15) disposal tank, (16) cleaning solution storage tank, (17) pump, (18) distilled or deionized water storage tank, (19) pump, and (20) mechanical structure with casters.
Figure 2:
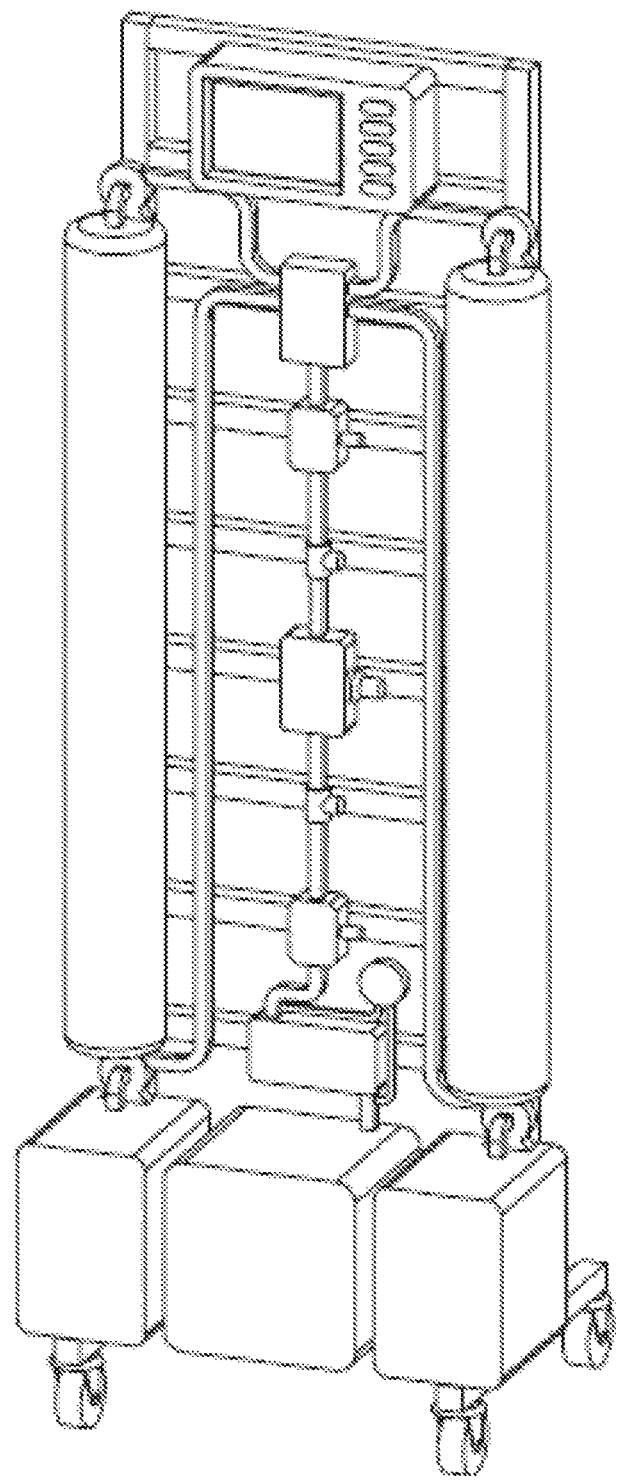
FIG. 2 illustrating an isometric view of the apparatus.

The apparatus, according to the present invention and illustrated in FIG. 1, comprises reagent storage tanks (2, 3); a tank for storing distilled or deionized water (18); a tank for storing cleaning solution (16); pumps for the circulation of fluids (4, 5, 17, 19) of the reciprocating and/or rotary type; a reagent mixing module (6) for forming the solution to be used in investigations; induction period measurement modules (7, 12), which can be conductivity or optical sensors, pH sensors, among others for measuring the appearance of the first crystals in the solution; an ultrasound-assisted precipitation module (9); a scaling module with heat exchanger (13) consisting of a coil machined in the part itself that makes up the module; temperature sensors (8, 11) of the encapsulated thermocouple, thermal resistance and semiconductor type; a pressure sensor (14) of capacitive, piezoelectric, potentiometric, resonant and optical type; and an electronic system (1) for activating and monitoring current and voltage of pumps and controlling of reagent flow rate.

Its operation takes place from the activation of the apparatus and adjustment of the flow rate of reagents by means of the command interface of the electronic system (1), which, once turned on, causes the reagents to be pumped from the first storage tank (2) and from the second storage tank (3) by means of the pumps (4) and (5), mixing them in the reagent mixing module (6). Then they pass through the first induction period measurement module (7), where it is possible to investigate the formation of the first crystals of the chemical component under study. Later, the fluid passes through the first temperature sensor (8) and through the ultrasound-assisted precipitation module (9); this module has a transparent window where it is possible to visualize the formation of crystals and carry out some type of monitoring by means of a camera or measurements with optical sensors. This module is further assisted by ultrasound by means of an ultrasonic transducer or piezoelectric wafer (10) coupled to its structure; this allows the effect of cavitation inside the module with the purpose of accelerating the chemical reaction and in turn the precipitation of crystals. The fluid then passes through the second temperature sensor (11) and the second induction period measurement module (12) and through the scaling module with heat exchanger (13); this module is designed so that there is scaling of the chemical component and so that it is possible to carry out weight, hardness and composition analyses. In this module, the pressure differential is measured by means of the pressure sensor (14), with the purpose of investigating the influence of scaling on the fluid flow rate. And finally, the fluid that leaves the scaling module with heat exchanger (13) goes to the disposal tank (15) for disposal of the solution used in the investigations in the apparatus.

To clean the apparatus modules and the pipes, first a cleaning solution stored in the tank (16) is circulated through the pump (17), and the fluid makes the same path as the reagents through the apparatus. Once the cleaning solution has passed, the distilled or deionized water stored in the tank (18) is circulated through the pump (19), in order to remove solution and dirt remaining in the components of the apparatus. All components are accommodated on a mechanical structure with casters (20) for easy handling and transport.

The apparatus of the present invention is applied to studies of precipitation and scaling of inorganics and tests of efficiency of inhibitors with or without influence of ultrasound. Such an apparatus is capable of investigating inorganic scaling for different flow rates, pressures, temperatures, reagent concentrations and ultrasound intensities.

The ultrasonic-assisted precipitation module (9) can consist of one or more ultrasonic or electroacoustic transducers, or even just piezoelectric wafers. The ultrasonic transducer or piezoelectric wafer (10) has a power from 5 to 100 W.

EXAMPLES

Tests were performed on the apparatus in order to observe the influence of ultrasound on the precipitation of calcium carbonate ($CaCO_3$). For the production of calcium carbonate, two equimolar solutions of calcium chloride (3500 ppm $Ca^{2+}$) and sodium carbonate were used. For each test, 5 liters of reagents were prepared.

Three tests were carried out, wherein the ultrasonic-assisted precipitation module was used. The first test, with the generator off, that is, 0 W of power and without ultrasound influence, the second test with 5 W of power, and the third with 20 W. The tests were carried out at a flow rate of 50 mL/min, the conductivity values of the solution were monitored every 2 seconds, and the tests lasted 60 minutes. During the tests, every 10 minutes an aliquot of 100 ml of the solution was removed from the outlet of the apparatus and used in the particulate material collection system.

Figure 3:
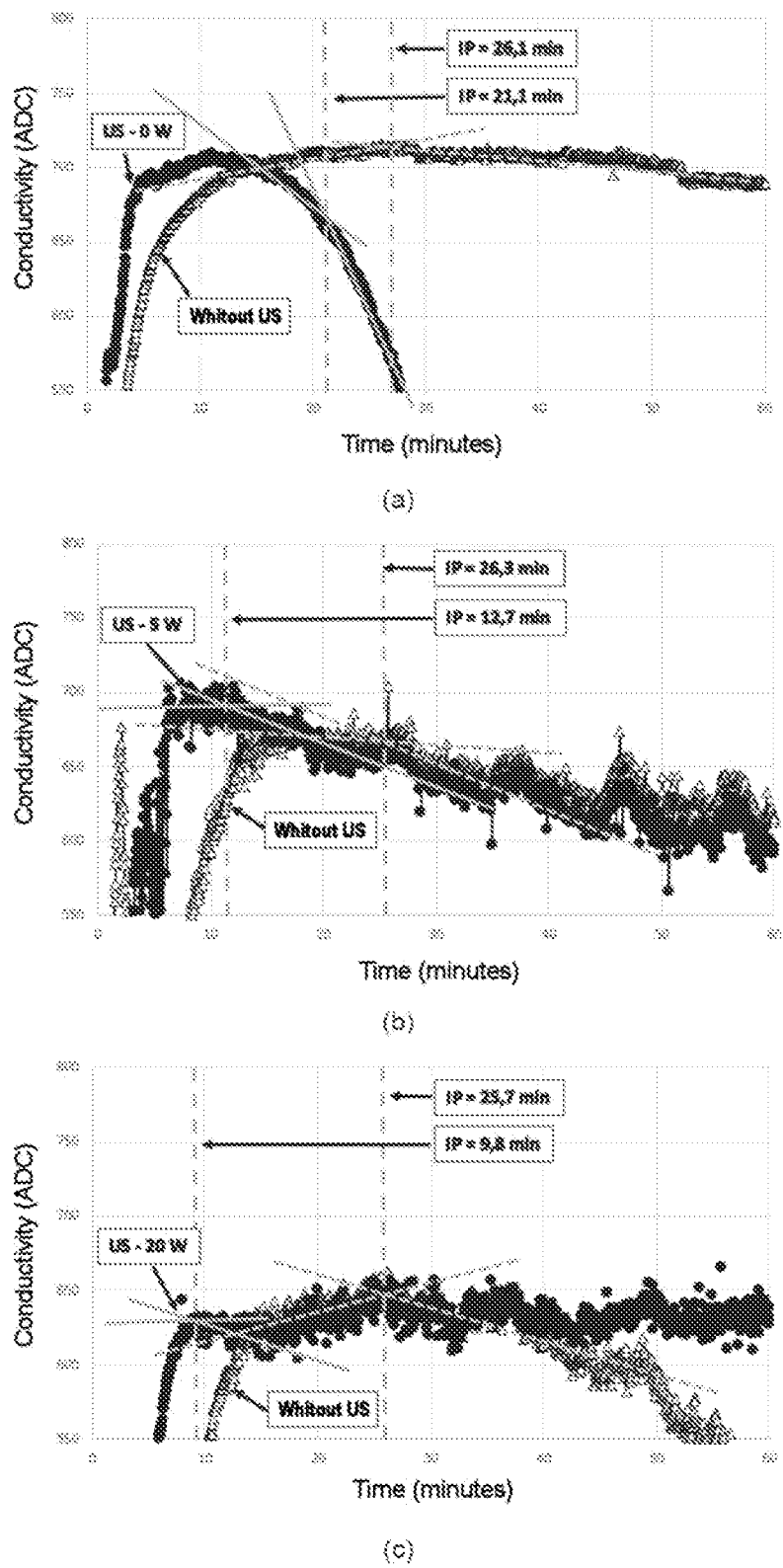
FIG. 3 illustrating graphs of conductivity as a function of ultrasound power (US): (a) 0 W, (b) 5 W and (c) 20 W.

FIG. 3 shows the graphs of conductivity as a function of time for the three tested powers. During the tests, the conductivity of the solution was monitored and used as an indicator of the formation of the first calcium carbonate crystals and, at the end, carbonate deposition was observed.

The induction period values obtained in the graph of FIG. 3 can be seen in Table 1, from which it is possible to see a decrease in the induction period as the ultrasound power (US) increases, with 26.1 minutes at 0 W and 9.8 minutes at 20 W, that is, a 62.4% decrease in the induction period.

TABLE 1

| Induction period (IP) values for the tested US powers. | | |
|---|---|---|
| US Power (Watts) | IP Sensor A | IP Sensor B |
| | (Minutes) | |
| 0 | 21.1 | 26.1 |
| 5 | 26.3 | 12.7 |
| 20 | 25.7 | 9.8 |

It should be noted that, although the present invention has been described in relation to the attached drawings, it may undergo modifications and adaptations by technicians skilled on the subject, depending on the specific situation, but provided that it is within the inventive scope as defined herein.

The invention claimed is:

1. An apparatus for ultrasound-assisted salt precipitation and scaling tests, the apparatus comprising:
   a first storage tank;
   a second storage tank;
   a first pump configured to pump a first reagent from the first storage tank;
   a second pump configured to pump a second reagent from the second storage tank;
   a mixer configured to receive the first reagent and the second reagent based on pumping by the first pump and the second pump, respectively, the mixer further configured to obtain a fluid mixture by mixing the first reagent and the second reagent;
   a first induction period measurer comprising a first sensor and configured to receive the fluid mixture downstream from the mixer;
   a first temperature sensor configured to measure a first temperature of the fluid mixture downstream from the first induction period measurer;
   an ultrasound-assisted precipitator configured to receive the fluid mixture downstream from the first temperature sensor,
   a transducer or piezoelectric wafer configured to cause cavitation within the ultrasound-assisted precipitator;

a second temperature sensor configured to measure a second temperature of the fluid mixture downstream from the ultrasound-assisted precipitator;

a second induction period measurer comprising a second sensor and configured to receive the fluid mixture downstream from the second temperature sensor;

a scaler with heat exchanger, the scaler with heat exchanger configured to receive the fluid mixture downstream from the second induction period measurer and cause scaling of a chemical component of the fluid mixture;

a pressure sensor configured to measure a pressure in the scaler with heat exchanger;

a disposal tank configured to receive the fluid mixture downstream from the scaler;

a cleaning solution storage tank;

a third pump configured to pump a cleaning solution from the cleaning solution storage tank to the mixer;

a distilled or deionized water storage tank; and a fourth pump configured to pump distilled or deionized water from the distilled or deionized water storage tank to the mixer.

2. The apparatus according to claim 1, further comprising an electronic system that is configured to:

drive the first pump, the second pump, the third pump, and the fourth pump; and control a flow rate of the first reagent and the second reagent.

3. The apparatus according to claim 2, wherein the third pump, by pumping the cleaning solution from the cleaning solution storage tank, is configured to cause dirt to be removed from at least one from among the mixer, the first induction period measurer, the ultrasound-assisted precipitator, the second induction period measurer, and the scaler.

4. The apparatus according to claim 3, wherein the electronic system is further configured to control the fourth pump to pump the distilled or deionized water from the distilled or deionized water storage tank to rinse the at least one from among the mixer, the first induction period measurer, the ultrasound-assisted precipitator, the second induction period measurer, and the scaler after the cleaning solution is pumped by the third pump.

5. The apparatus according to claim 1, wherein the fluid mixture obtained by the mixer is a solution.

6. The apparatus according to claim 1, wherein the first pump, the second pump, the third pump, and the fourth pump are reciprocating and/or rotating pumps.

7. The apparatus according to claim 1, wherein each of the first sensor of the first induction period measurer and the second sensor of the second induction period measurer is a conductivity sensor or an optical sensor that is configured to measure an appearance of first crystals in the fluid mixture.

8. The apparatus according to claim 1, wherein each of the first sensor and the second sensor is an encapsulated thermocouple, thermal resistance and semiconductor type.

9. The apparatus according to claim 1, wherein the transducer or piezoelectric wafer is an ultrasonic or electroacoustic transducer.

10. The apparatus according to claim 1, wherein the transducer or piezoelectric wafer has a power of 5 to 100 W for producing the cavitation in the fluid mixture contained in the ultrasound-assisted precipitator.

11. The apparatus according to claim 1, wherein the scaler with heat exchanger comprises a coil that is configured to obtain scaling of the chemical component.

12. The apparatus according to claim 1, wherein the pressure sensor is a capacitive, piezoelectric, potentiometric, resonant, or optical sensor that is configured to measure a pressure differential in the scaler with heat exchanger.

13. The apparatus according to claim 1, further comprising a mechanical structure that is configured to accommodate the first storage tank, the second storage tank, the first pump, the second pump, the mixer, the first induction period measurer, the first temperature sensor, the ultrasound-assisted precipitator, the transducer or piezoelectric wafer, the second temperature sensor, the second induction period measurer, the scaler, the pressure sensor, the disposal tank, the cleaning solution storage tank, the third pump, the distilled or deionized water storage tank, and the fourth pump, wherein the mechanical structure comprises casters configured to move the apparatus.

14. A method performed by an apparatus for ultrasound-assisted salt precipitation and scaling tests, the method comprising:

pumping, by a first pump of the apparatus, a first reagent from a first storage tank of the apparatus;

pumping, by a second pump of the apparatus, a second reagent from a second storage tank of the apparatus;

obtaining, by a mixer of the apparatus, a fluid mixture by mixing the first reagent and the second reagent in the mixer;

receiving, by a first induction period measurer of the apparatus, the fluid mixture downstream from the mixer, wherein the first induction period measurer includes a first sensor;

measuring, by a first temperature sensor of the apparatus, a first temperature of the fluid mixture downstream from the first induction period measurer;

receiving, by an ultrasound-assisted precipitator of the apparatus, the fluid mixture downstream from the first temperature sensor;

causing, by a transducer or piezoelectric wafer of the apparatus, cavitation within the ultrasound-assisted precipitator;

measuring, by a second temperature sensor of the apparatus, a second temperature of the fluid mixture downstream from the ultrasound-assisted precipitator;

receiving, by a second induction period measurer of the apparatus, the fluid mixture downstream from the second temperature sensor, wherein the second induction period measurer includes a second sensor;

receiving, by a scaler with heat exchanger of the apparatus, the fluid mixture downstream from the second induction period measurer;

causing, by the scaler with heat exchanger, scaling of a chemical component of the fluid mixture;

measuring, by a pressure sensor of the apparatus, a pressure in the scaler with heat exchanger; and receiving, by a disposal tank of the apparatus, the fluid mixture downstream from the scaler.

15. The method according to claim 14, further comprising cleaning solvent or dirt from the apparatus by:

pumping, by a third pump of the apparatus, cleaning solution from a cleaning solution storage tank of the apparatus through at least one from among the mixer, the first induction period measurer, the ultrasound-assisted precipitator, the second induction period measurer, and the scaler; and pumping, by a fourth pump of the apparatus, distilled or deionized water from a distilled or deionized water storage tank of the apparatus through the at least one from among the mixer, the first induction period measurer, the ultrasound-assisted precipitator, the second induction period measurer, and the scaler.

16. An apparatus for ultrasound-assisted salt precipitation and scaling tests, the apparatus comprising:
- a first storage tank;
- a second storage tank;
- a first pump configured to pump a first reagent from the first storage tank;
- a second pump configured to pump a second reagent from the second storage tank;
- a mixer configured to receive the first reagent and the second reagent based on pumping by the first pump and the second pump, respectively, the mixer further configured to obtain a fluid mixture by mixing the first reagent and the second reagent;
- a first induction period measurer comprising a first sensor and configured to receive the fluid mixture downstream from the mixer;
- a first temperature sensor configured to measure a first temperature of the fluid mixture downstream from the first induction period measurer;
- an ultrasound-assisted precipitator configured to receive the fluid mixture downstream from the first temperature sensor,
- a transducer or piezoelectric wafer configured to cause cavitation within the ultrasound-assisted precipitator;
- a second temperature sensor configured to measure a second temperature of the fluid mixture downstream from the ultrasound-assisted precipitator;
- a second induction period measurer comprising a second sensor and configured to receive the fluid mixture downstream from the second temperature sensor;
- a scaler with heat exchanger, the scaler with heat exchanger configured to receive the fluid mixture downstream from the second induction period measurer and cause scaling of a chemical component of the fluid mixture;
- a pressure sensor configured to measure a pressure in the scaler with heat exchanger; and
- a disposal tank configured to receive the fluid mixture downstream from the scaler.

* * * * *